Jan. 7, 1941.  A. D. SINDEN  2,227,557
CONVEYER
Filed Oct. 14, 1938
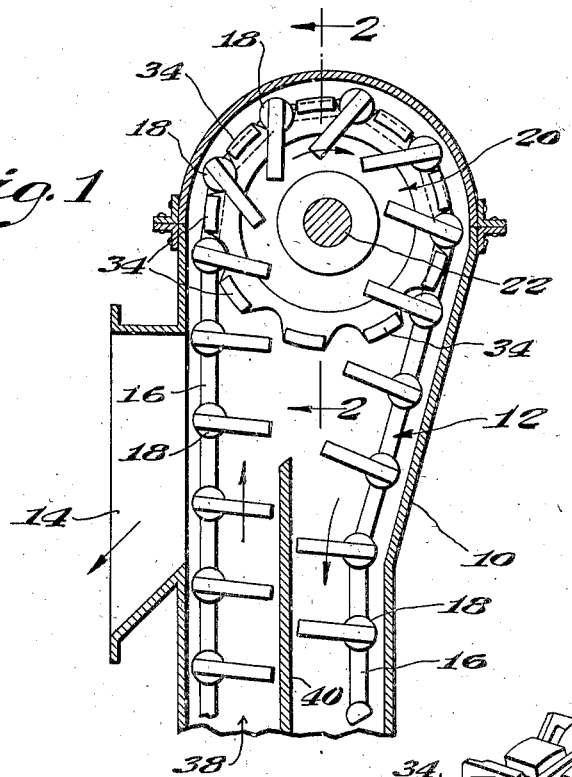
Fig. 1
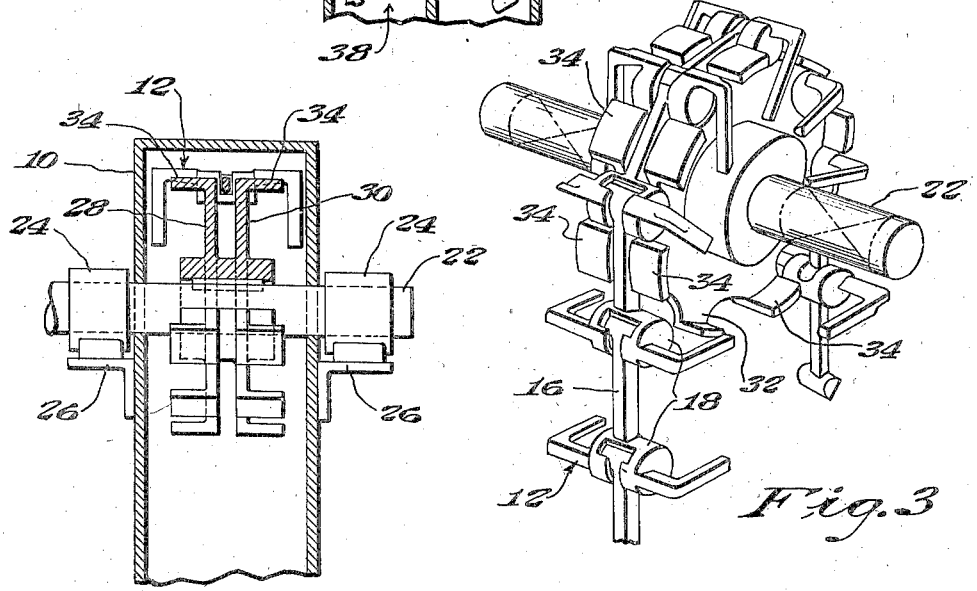
Fig. 2
Fig. 3
INVENTOR
Alfred Delos Sinden
BY J. Stanley Churchill
ATTORNEY Patented Jan. 7, 1941

2,227,557

UNITED STATES PATENT OFFICE 2,227,557

CONVEYER

Alfred Delos Sinden, Aurora, Ill., assignor to Redler Conveyor Company, Quincy, Mass., a corporation of Massachusetts Application October 14, 1938, Serial No. 235,017

4 Claims. (Cl. 198—168)

This invention relates to a conveyer of the type in which a conveying element having transversely extended flights is drawn through a conduit or casing.

The object of this invention is to produce a novel and improved conveyer of the character specified particularly designed for use in a conveyer for the conveyance of materials of an adhesive character adapted to effect the clearance of material from the conveying element in a novel and improved manner, thus enabling the conveyer to be operated with maximum efficiency upon sticky as well as freely flowable materials.

With this general object in view, and such others as may hereinafter appear, the invention consists in the conveyer and in the various structures, arrangements and combinations of parts hereinafter described and particularly defined in the claims at the end of this specification.

In the drawing illustrating the preferred embodiment of the invention, Fig. 1 is a vertical section through the upper portion of a conveyer embodying the present invention; Fig. 2 is a cross-sectional view on the line 2—2 of Fig. 1, and Fig. 3 is a perspective view of the upper portion of the conveyer with the casing removed.

The present invention contemplates a conveyer of the type shown in the United States Reissue Patent No. 18,445 to Redler comprising a casing provided with an inlet and an outlet and a conveying element having a plurality of transversely extended flights, arranged to be drawn through the casing to effect the conveyance of the material therethrough. The conveying element may and preferably will be arranged to be drawn through the casing by driving means including one or more rotary elements over which the conveying element is caused to pass. Experience with conveyers of the type shown in said Redler reissue patent has shown that when materials having a tendency to adhere to the conveying element are being conveyed, some of the material may be carried beyond the outlet in the casing and may pass over the driving element to be returned to the source of the material with the conveying element. The present conveyer is particularly adapted for the conveyance of sticky materials and is effective in maintaining the conveying element substantially free of material as it passes over the driving element to the end that the open flights of the conveying element may be maintained in a clean condition whereby maximum operating efficiency may be obtained, even when sticky materials are being conveyed.

Referring to the drawing, the illustrated conveyer comprises a conduit 10 having a conveying element 12 associated therewith to be drawn therethrough to effect the conveyance of the material through the conduit. The conduit 10 may and preferably will be provided with the usual inlet, not shown, and outlet 14, all as disclosed in the Redler Reissue Patent No. 18,445.

The conveyer is provided with a conveying element 12 made up of a plurality of individual units or flights of open structure constructed to be capable of being detachably and pivotally connected together and capable of effecting the conveyance of the material in a continuous stream in accordance with the aforesaid Redler reissue patent. The conveying element 12 may comprise a plurality of individual and detachably connected flights each provided with a rigid member 16 having a hollow hub 18 at one end and having an enlargement at the other end capable of being received within the hollow hub of the succeeding flight to pivotally and detachably connect the flights together.

In the preferred embodiment of the invention, as herein illustrated, the casing or conduit 10 is upright and the outlet 14 is disposed near the upper end of the same. A rotary element over which the conveying element passes is mounted between the outlet 14 and the upper end of the casing and as herein shown comprises a double sprocket 20 mounted upon a cross shaft 22. The shaft 22 may be journaled in suitable bearings 24 supported upon angle plates 26 secured to the casing 10 and the shaft may be driven in any usual or preferred manner. The double sprocket is provided with flanges 28, 30 having teeth 32 between which the hubs 18 of the flights are received during the operation of the conveyer. As herein shown, the flanges 28, 30 are provided with outwardly extending vanes 34 which are formed integrally with and extend at right angles from the teeth 32. The vanes thus provided on the sprocket teeth pass between the flights and also are arranged to pass through the open flights during the operation of the conveyer and are effective in pushing out any material lodged upon or between the flights.

From the description thus far, it will be observed that in the operation of the conveyor, the driving sprocket 20 is rotated and the conveying element 12 is drawn through the casing 10 and the material is carried upwardly through the leg 38, formed by the sides of the casing and a dividing partition 40. When the material arrives at the opening 14 it flows out of the opening by gravity to be delivered from the conveyer. Any material of such a nature that it may have a tendency to cling to the conveying element and be carried beyond the opening 14 will then be removed when the vanes 34 pass through and between the flights as the conveying element 12 passes over the sprocket 20 and the material thus loosened will drop down and flow out of the opening 14 with the main body of the material.

While the preferred embodiment of the invention has been herein illustrated and described, it will be understood that the invention may be embodied in other forms within the scope of the following claims.

Having thus described the invention, what is claimed is:

1. In a conveyer of the character described, in combination, a casing having an inlet and an outlet, a conveying element traversable through the casing and provided with a plurality of spaced flights of open structure for effecting the conveyance of material through the casing in a continuous stream and a sprocket over which said conveying element passes, said sprocket being provided with relatively wide flanges extending laterally from the teeth thereof and adapted to pass between adjacent flights of the conveying element for entirely dislodging material therefrom.

2. In a conveyer of the character described, in combination, a casing having an inlet and an outlet, a conveying element traversable through the casing and provided with a plurality of spaced pivotally connected U-shaped flights of open structure for effecting the conveyance of material through the casing and a rotary element over which the conveying element passes comprising a pair of sprockets spaced apart and arranged to cooperate with opposed portions of the conveying element during the passage of the conveying element thereover, each of said sprockets being provided with relatively wide flanges extending laterally and outwardly from the teeth thereof adapted to pass between adjacent flights of the conveying element and to substantially fill the space therebetween for entirely dislodging material therefrom.

3. In a conveyer of the character described, in combination, an upright casing having an inlet at its lower end and an outlet at the upper end portion thereof, a conveying element traversable through the casing and provided with a plurality of spaced pivotally connected U-shaped flights of open structure for effecting the conveyance of material from said inlet to said outlet, and a pair of sprockets at the upper end of the casing around which the conveying element passes, each of said sprockets being provided with relatively wide flanges extending outwardly from the teeth thereof and adapted to pass within the flights during the passage of the conveying element from the outlet around said sprocket for entirely dislodging material from within and between said flights.

4. In a conveyer of the character described, in combination, a casing having an inlet and an outlet, an endless conveying element traversable through the casing provided with a plurality of pivotally connected U-shaped flights of open structure adapted to effect conveyance of the material in a solid column of substantial thickness, and a pair of cylindrical sprockets over which said conveying element passes, each of said sprockets being provided with relatively wide flanges extending laterally and outwardly from the teeth thereof and adapted to sweep between the legs of said U-shaped flights and to extend into and substantially fill the space between adjacent flights during the passage of the conveying element over said sprockets whereby to entirely dislodge the material from within and between said flights.

ALFRED DELOS SINDEN.